2,850,359

TESTING UNIT AND METHOD OF TESTING FOR GLUCOSE

Charles C. Worthington and Joseph D. Teller, Freehold, N. J., assignors to Worthington Biochemical Corporation, Freehold, N. J., a corporation of New Jersey No Drawing. Application September 7, 1956
Serial No. 608,425

8 Claims. (Cl. 23—230)

This invention relates to testing unit and method of testing for glucose and relates more particularly to means for and method of detecting and determining the glucose content of an aqueous solution. A principal application of this invention is that of testing for the presence of glucose in urine.

Normal urine contains no glucose. However, in diabetes there is an elevated blood sugar level and when this level exceeds the kidney threshold for glucose there is an occurrence of glucose in the urine. For purposes of diagnosis and treatment, the testing of urine for glucose content is extensively resorted to. Heretofore the testing procedure most extensively employed for determining glucose content either of blood or of urine was based upon the power of glucose to reduce certain metal ions in solution. However, this test has the disadvantage of not being specific for glucose, and since urine may contain reducing material other than glucose that gives a positive reaction even in the absence of glucose, the test may vary considerably in reflecting the true glucose content.

More recently enzymatic reactions have been resorted to for determining the presence of glucose in an aqueous solution. Glucose in the presence of the enzyme glucose oxidase becomes converted to gluconic acid and hydrogen peroxide. When the enzyme peroxidase also is present the hydrogen peroxide which is formed becomes converted to oxygen and water. Since one atom of oxygen is liberated for each molecule of hydrogen peroxide formed by conversion of glucose to gluconic acid and hydrogen peroxide, the oxygen thus produced may be utilized for modifying the color of a chromogenic oxygen acceptor, namely, an oxidizable dye whose color is affected by the amount of oxygen that is caused to react therewith. A color change thus effected indicates the presence of glucose in the solution to be tested and the amount of the color change is indicative of the amount of glucose in the original solution.

The above described enzymatic reaction for determining the presence of glucose in an aqueous solution has previously been known, and in carrying out the test the reagents have been caused to be taken up by an absorbent paper and dried. The absorbent paper in the form of strips or pieces thus prepared may then be utilized merely by contacting the piece of test paper or a portion thereof with the solution to be tested, e. g. urine, and noting any color change of the test paper.

The above mentioned enzymatic reaction has presented certain drawbacks in that the color reaction does not accurately reflect the amount of glucose in the solution tested. For example, when a known amount of glucose was added to normal urine free of glucose in an amount ranging from 0.05 to 0.25%, as much as 80% of the added glucose did not contribute to producing an observable color change. In other words, the amount of color change in the chromogenic oxygen acceptor was only about one-fifth that which theoretically should occur because of the known quantity of glucose contained in the urine sample tested.

According to this invention, an aqueous solution to be tested for glucose content instead of being brought directly into contact with the aforesaid enzymatic reagents is first subjected to the action of an adsorbent and it has been found that when this step is carried out there is an effective removal of inhibiting substances which prevent the aforesaid enzymatic reaction from accurately reflecting the entire glucose content of the solution to be tested.

For providing a test unit according to this invention, the unit comprises two zones. One zone contains the reagents glucose oxidase, peroxidase and a chromogenic oxygen acceptor. The other zone contains the adsorbent and is employed in combination with the first zone so that the solution to be tested traverses the second zone where it is contacted with the adsorbent material before the solution to be tested reaches the first zone where the enzymatic reaction occurs. The zones preferably are provided using an absorbent sheet material such as filter paper or blotting paper, there being a body portion containing the enzymatic reagents in dried form and an adjoining portion, such as the end of a small strip, that is permeated by the adsorbent material.

When the adsorbent occurs at the end of a small strip of paper, the solution to be tested, such as urine, is applied to the end of the strip where the adsorbent occurs and the solution is carried by capillary action into the body portion of the strip containing the enzymatic reagents. By thus traversing the end portion of the strip that is permeated with the adsorbent material, inhibiting substances which interfere with the enzymatic reaction are absorbed and when the solution reaches the body portion containing the enzymatic reagents the resulting color development more accurately reflects the glucose content of the solution.

It is believed that one of the inhibitors which interferes with the development of the colorimetric responsiveness that might otherwise be attained utilizing the above mentioned enzymatic reaction is uric acid, which interferes with the reaction by competing with the chromogenic oxygen acceptor for taking up some of the oxygen which is caused to be liberated, when glucose is present, by the above mentioned reactions using both glucose oxidase and peroxidase. Accordingly, adsorbent materials which are used according to this invention for testing urine or other solution containing uric acid are adsorbents for uric acid contained in an aqueous solution. The adsorbent does not appreciably alter the glucose content of the solution to be tested.

The inhibitor adsorbent which is preferably employed in the practice of this invention is activated charcoal. One activated charcoal which has been found to be very satisfactory is that sold under the trade name and designation Darco G-60. Other uric acid adsorbents which may be used are bentonite, kaolin and fuller's earth. The latter adsorbents are somewhat less efficient in their capacity to adsorb the inhibiting substance or substances as compared with activated charcoal; however, these adsorbents have the commercial advantage of being light colored.

In preparing a test unit which may be preferably employed according to this invention, the base material which is used consists of an absorbent sheet material such as filter paper or blotting paper which is adapted to receive the adsorbent material so as to permeate substantially throughout the thickness thereof as distinguished from mere surface application. The adsorbent may be applied to the absorbent base material in any convenient manner as by making an aqueous slurry of the adsorbent and applying the slurry to a limited area of the absorbent sheet material while subjecting the opposite side of the sheet material to a vacuum effective for sucking the slurry into the sheet material where all or part of it is retained. Alternatively, the adsorbent in finely particulate form may be dispersed in air as a dust and by causing the dust-laden air to be passed through a predetermined area of the absorbent sheet material a substantial amount of the adsorbent may be left entrained in the interstices of the absorbent sheet material used as the base for the test unit.

By way of more specific exemplification of the practice of this invention, 3.7 grams of orthotolidine are dissolved in 166 ml. of 95% ethanol. To this solution 95 ml. of water is added and the pH is adjusted to 4.6 using 4-N formic acid. The solution thus prepared is diluted with water to a total of 285 mls. For 3 volumes of the solution of chromogenic oxygen acceptor thus prepared 1 volume thereof is commingled with a filtered aqueous solution containing 0.03% horseradish peroxidase and 3.5% glucose oxidase. The resulting solution containing the enzymatic reagents is applied to the body portion of a strip of filter paper which is then air dried, thereby providing the zone which exhibits the desired colorimetric reaction with an aqueous solution containing glucose. The foregoing steps are illustrative of conventional practice. However, according to this invention the paper that is used is one which has been locally pretreated so as to be permeated with an adsorbent, preferably activated charcoal, in a zone separate from the body portion containing the enzymatic reagents but adjacent thereto. For providing a convenient commercial unit, the zone having the activated charcoal or other adsorbent dispersed therethrough is caused to occur at the end of a small strip, which may be, for example, about ¼" in width, so that it will permeate the strip extending about ¼" from the end thereof. It is important to maintain the zones containing the adsorbent and containing the enzymatic reagent distinct from each other without substantial overlapping of the zones. This may be accomplished in any suitable way, as by first applying the adsorbent material in a predetermined area and then applying the solution of enzymatic reagents in a limited amount at such distance from the area containing the adsorbent material that the enzymatic reagents will not be carried into the zone where the adsorbent material occurs.

When a test unit has been prepared such as an absorbent fibrous strip according to the preceding example, it normally is used by bringing the end of the strip containing the adsorbent material into contact with the solution to be tested as, for example, one or two drops of urine. The solution then spreads along the strip by capillary action and the inhibiting substance such as uric acid is adsorbed by the adsorbent during the traverse of the solution to be tested through the zone where the adsorbent material occurs. This traverse occurs rapidly and when the solution to be tested comes into contact with the zone where the enzymatic reagents occur the colorimetric reaction takes place, with resultant development of blue coloration according to the amount of glucose present in the solution, in a manner which more accurately reflects the actual glucose content of the tested solution than if the solution to be tested were to have been applied directly to the zone where the enzymatic reagents occur.

While ortho-tolidine has been exemplified as a suitable chromogenic oxygen acceptor for use in the enzymatic colorimetric reaction, other chromogenic oxygen acceptors may be used such as ortho-dianisidine. The term "chromogenic oxygen acceptor" as used herein and in the claims refers to any substance which is responsive to the action of oxygen with an accompanying color change, whether by way of development of color from an original colorless condition or by diminution of an original colored condition or by change from one color to another.

The amounts of the enzymatic reagents, namely, the glucose oxidase, the peroxidase and the chromogenic oxygen acceptor, are not critical so long as each reagent is present in an amount adequate for the production of a detectable color change in the chromogenic oxygen acceptor. Due to the sensitivity of the enzyme activity, the amounts for a single test unit may be very small and of the order exemplified in the foregoing example of the practice of this invention.

With regard to the amount of adsorbent utilized, the amount is not critical so long as there is sufficient adsorbent for contacting the solution to be tested prior to its becoming commingled with the enzymatic reagents. When the test unit is in the form of a paper strip or the like the function of the adsorbent is merely that of adsorbing such relatively minute amounts of any inhibiting substance such as uric acid which may be present in two or three drops of solution to be tested, e. g. urine. An application of adsorbent to the end portion of a strip of filter paper so as to permeate the paper provides ample power to effect adsorption which removes inhibiting substances from the solution to be tested.

While the inhibitor which interferes with the sensitivity and responsiveness of the enzymatic reagents to glucose is believed to be uric acid, there may be other inhibitors which are responsible in whole or in part, as by having a reducing activity, for having an adverse effect on the colorimetric reaction that would take place if no other substances were to be present in the solution to be tested other than glucose and pure water. For this reason this invention is applicable generally to the utilization of an adsorbent with which the solution to be tested is contacted prior to the solution coming into contact with the enzymatic reagents whereby one or more inhibiting substances are adsorbed and the residual solution is rendered more accurately responsive to the colorimetric enzymatic reaction.

While the nature and extent of color development may vary depending on the kind and amount of chromogenic oxygen acceptor which is utilized, nevertheless when a number of test units are made up to the same predetermined specifications the amount and nature of the color development is responsive to the amount of glucose present in the solution to be tested and by comparison with known solutions a basis for quantitative glucose determinations is provided. Such quantitative determinations have heretofore been possible in the case of solutions of glucose in pure water but for diagnostic and testing purposes the solutions to be tested do not consist of glucose in pure water but contain other substances including inhibitors for the colorimetric enzymatic reaction. The presence of the inhibitors not only adversely affects the sensitivity of the colorimetric reaction but also affects the reaction depending upon the amount of inhibitor present, which amount may vary as between different samples of urine, with the result that for corresponding amounts of glucose different colorimetric responses take place and the colorimetric response does not provide a reliable basis for quantitatively indicating the glucose content of the solution tested. However, according to the present invention, to the extent that the inhibiting substance which may be present is removed by adsorption on the adsorbent prior to the solution coming into contact with the enzymatic reagents the colorimetric reaction is caused to increasingly provide a more accurate determination of the amount of glucose present in the solution that is tested, and one may obtain results having quantitative accuracy substantially corresponding to the results obtainable in testing solutions of glucose in pure water. Moreover, by removal of the inhibiting substances the sensitivity of the glucose test can be increased so that the presence of as little as 0.05% glucose in urine may be detected.

What is claimed is:

1. A testing unit for testing an aqueous solution for glucose content comprising a body portion which contains the reagents glucose oxidase, peroxidase, and a chromogenic oxygen acceptor reactive with attendant color change with oxygen produced by reaction of glucose with said glucose oxidase in the presence of said peroxidase and which is adapted for the reception therein of solution to be tested and in combination with said body portion an adjoining solution receiving portion which is traversable by solution to be tested prior to its reception in said body portion and which is permeated by a substance that is an adsorbent for an inhibitor of said reaction contained in the solution to be tested and that is substantially without adsorbency for glucose contained in said solution.

2. A testing unit for testing an aqueous solution for glucose content which comprises a base of dry, absorptive, fibrous sheet material having adjoining first and second zones, said first zone being permeated by the reagents glucose oxidase, peroxidase and a chromogenic oxygen acceptor reactive with attendant color change with oxygen produced by reaction of glucose with said glucose oxidase in the presence of said peroxidase, and said second zone being permeated by a substance which is an adsorbent for an inhibitor of said reaction contained in the solution to be tested and which is without substantial adsorbency for glucose contained in said solution.

3. A testing unit according to claim 2 wherein said substance is activated charcoal.

4. A testing unit according to claim 2 wherein said substance is bentonite.

5. A testing unit according to claim 2 wherein said substance is kaolin.

6. A testing unit according to claim 2 wherein said substance is fuller's earth.

7. A testing unit for testing urine for glucose content which comprises a strip of absorbent fibrous sheet material having an end portion permeated with a uric acid adsorbent and adjoining said end portion a body portion impregnated with the reagents glucose oxidase, peroxidase and a chromogenic oxygen acceptor reactive with attendant color change with oxygen produced by reaction of glucose with said glucose oxidase in the presence of said peroxidase, said uric acid adsorbent being without substantial adsorbency for glucose contained in urine.

8. In a method of testing for the glucose content of a urine sample containing glucose and uric acid by colorimetric reaction utilizing in combination for reaction with glucose in said urine the reagents glucose oxidase, peroxidase and a chromogenic oxygen acceptor reactive with attendant color change with oxygen produced by reaction of glucose with said glucose oxidase in the presence of said peroxidase, the step of removing the uric acid content from said urine sample by its adsorption on an adsorbent therefor prior to contacting said urine sample with said reagents, said adsorbent being substantially without adsorbency for the glucose contained in said urine sample.

References Cited in the file of this patent

UNITED STATES PATENTS 1,321,062    Lamb et al. _____ Nov. 4, 1919